United States Patent

[11] 3,614,308

[72] Inventors Katsuyuki Iwai; Motonori Fukatsu; Fujio Sato, all of Tokyo, Japan
[21] Appl. No. 577,924
[22] Filed Sept. 8, 1966
[45] Patented Oct. 19, 1971
[73] Assignee Akai Electric Company Limited Tokyo, Japan
[32] Priority Dec. 20, 1965
[33] Japan
[31] 78191/1965

[54] MAGNETIC RECORDING AND REPRODUCING SYSTEM WITH ALTERNATING POLARITY INVERSION

2 Claims, 10 Drawing Figs.

[52] U.S. Cl. .......... 178/6.6 A, 178/DIG. 3, 178/6.6 HS, 179/100.2 R
[51] Int. Cl. .......... G11b 5/02, H04n 5/78, H04n 7/12
[50] Field of Search .......... 178/6.6 A, 6; 179/100.2

[56] References Cited

UNITED STATES PATENTS

| | | | |
|---|---|---|---|
| 2,281,891 | 5/1942 | Terry | 178/7.1 |
| 2,734,941 | 2/1956 | Zenel | 178/6.6 |
| 2,867,685 | 1/1959 | Johnson | 178/6.6 A |
| 3,403,231 | 9/1968 | Slaton | 179/100.2 |

*Primary Examiner*—Bernard Konick
*Assistant Examiner*—Howard W. Britton
*Attorney*—Sughrue, Rothwell, Mion, Zinn & Macpeak ABSTRACT: Apparatus for direct-recording and direct-reproducing television video signals in longitudinal tracks on magnetic tape by reversing the polarity of the video signals at intervals at least as long as the horizontal period of the video signal. Gating pulses are generated responsive to the blanking signals for alternately gating the inverted and noninverted video signals.

INVENTOR
KATSUYUKI IWAI
MONTONORI FUKATSU
FUJIO SATO
BY
ATTORNEYS

MAGNETIC RECORDING AND REPRODUCING SYSTEM WITH ALTERNATING POLARITY INVERSION

This invention relates generally to improvements in and relating to video tape recording and reproducing machines, hereinafter briefly referred to as the "tape recorder." More specifically, it relates to video signal magnetic recording and reproducing system embodied in the tape recorder.

In such system as referred to above, especially when direct-recording and direct-reproducing technique is employed considerable difficulties have been encountered in stabilizing the synchronizing signals comprised in the reproduced video signal. It is to be noted throughout this specification that the term "direct" recording means a magnetic recording technique wherein the conventionally employed FM modulation has been completely dispensed with. In the similar way, the "direct" reproduction means a magnetic reproducing technique wherein the conventionally employed FM demodulation 6 been completely dispensed with.

In the video signal reproducing technique, as in the case of audio technique, the reproduction by means of a magnetic reproduction head relies upon the voltage induced by the degree of alteration in the pickup magnetic fluxes which means that the magnetic reproduction is in itself of the differentiating nature. For obviating the irregularity as developed in the reproduced signal it is processed for correction in an equalizer circuit designed, by way of example, to have a damping characteristic as at 6db./oct. Even with use of such a correction means as this, the thus processed signal can not be corrected enough throughout the whole frequency range. This incomplete correction is rather predominant in the range of lower frequency signal components. The resulting signal upon this corrected will generally be subject to considerable deformation, especially in the shape of the vertical synchronizing signals comprised in the reproduced television signal, as will be more fully and specifically described hereinafter.

As a generally employed counter measure for the correction of the thus resulted unintentionally wavy television signal when seen as a whole for an extended time interval, clamp circuit is provided in the reproducing system for the peaks of the synchronizing signals at a constant signal level. Experience has shown, however, that even with use of such a clamp circuit, it is highly difficult to shape correctly the distorted vertical synchronizing signals to a satisfying degree. When such a reproduced signal, thus comprising highly distorted lower frequency signal components such as vertical synchronizing pulses, is fed to a monitoring device, considerable difficulties will be encountered in the separation of the synchronizing signal from the reproduced television signal and the produced picture images will be subjected to appreciable fluctuations on account of the unstable conditions of these synchronizers.

It is therefore the main object of the invention to provide a highly improved video recording and reproducing system, yet of simpler design, wherein the reproduced synchronizing signals are highly precisely and sufficiently shaped to provide sharply defined and well stabilized pictures upon being reproduced.

A further considerable drawback as met in the conventional comparative technique which is highly difficult to solve without use of highly complicated circuitry is a disadvantageous signal/noise ratio which will be abbreviated as S/N hereinafter throughout the specification. This is caused by the wider voltage range of the video signal in comparison with the relatively narrow linear characteristic range of the recording magnetic medium such as magnetically coated recording tape.

A further object of the present invention is to provide a video tape recording and reproducing system of the kind of above referred to, capable of providing a highly improved S/N as compared with that obtainable by the conventional technique, as will be more fully and specifically described hereinafter with reference to the accompanying drawings.

In a video signal direct-recording and direct-reproducing system fitted with a recording and a reproducing magnetic head, respectively, kept in sliding contact with one and the same track on an elongated magnetizable tape threaded on a tape recorder for running a predetermined constant speed, the invention is characterized by such means for reversing the video signal to be fed to the recording head in its polarity at time intervals in the recording system, and further by means for reversing back the thus reversed polarity of the reproduced signal at the corresponding time intervals in the reproducing system, for providing a regularly shaped television signal which is the same as that fed to said recording system.

Before initiating the detailed description of several preferred embodiments of the invention, the drawbacks inherent, in the prior art briefly mentioned hereinbefore, will be further specifically described with reference to FIGS. 1 and 2.

Figure 1:
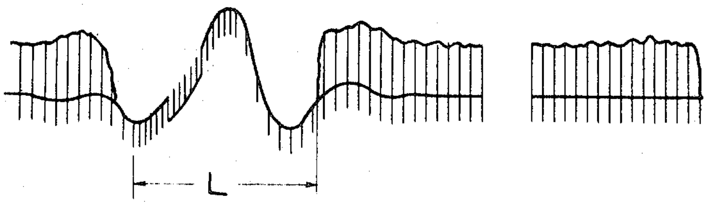
FIG. 1 is a schematic representation of a part of television signal as reproduced in a conventional direct-recording and direct-reproducing video-tape recorder, showing specifically the conventionally met distorted part of the signal, especially appearing at the vertical blanking period.

In FIG. 1, a model of reproduced video signal as appearing upon a direct-recording and a direct-reproducing referred to hereinbefore is schematically illustrated. In this figure, the part of the signal extending over the vertical blanking period "L" shown therein is seen as highly distorted from the corresponding regular shape which is not shown on account of its highly familiar nature.

Figure 2:
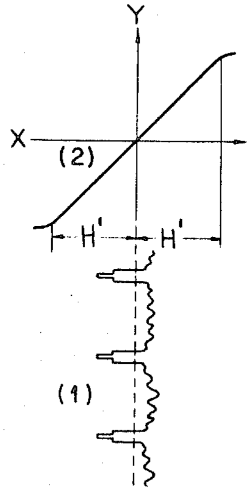
FIG. 2 is a schematic characteristic curve showing the relation between the residual magnetism on a recorded magnetic tape and an impressed magnetic field in the case of magnetic recording of television signal.

Further referring to FIG. 2, the problem of S/N as appearing as appreciable in the direct-recording operation will be be described. When the biasing technique is employed, the residual magnetism on a magnetizable recording medium will be shown in the figure, wherein however, it should be understood that the symbol H' is not of the meaning as commonly employed in the television engineering, but of the meanings as conventionally used in the magnetic engineering. It will be well understood that when the impressed magnetic field is that lying within the range of ±H', the desirous linear characteristic in the magnetic conversion will be maintained.

The amplitude or peak-to-peak value of the signal (1) to be recorded should be as large as possible within the range defined by said ±H', so as to make the S/N as large as possible. However, in AC-coupling equipment such as magnetic recording and reproducing devices, considerable loss of the lower frequency components of the television signal is normally encountered, the alternating current axis of the signal is subjected to considerable fluctuations and the total amplitude range will become considerably larger than the peak-to-peak value. Therefore, in order to make the straight line portion 2H' of the residual magnetism characteristic curve (2), FIG. 2 sufficient to cover the total amplitude range, the peak-to-peak value of the signal should be made considerably smaller than said 2H', thereby corresponding reducing the S/N.

In addition, it may be said without exaggeration that according to the conventional art, various noises as derived from the tape system as well as amplifier system and appearing overlapped on the video signal could not be removed to a satisfying degree.

Figure 3:
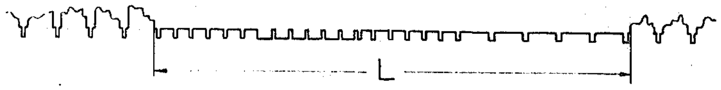
FIG. 3 is an enlarged schematic diagram, illustrating the shape of part of a television signal substantially in the course of a vertical blanking period.

In FIG. 3, a part of a model of the regular television signal, especially that covering over a vertical blanking period denoted by "L," is schematically illustrated, in a sharp comparison with the corresponding distorted model denoted equally by the same symbol in FIG. 1.

This kind of television signal contains naturally a large amount of lower frequency components and when this signal is led to pass through a system having a low-frequency transmission characteristic, the resulted or processed signal will represent an appreciable distortion in its shape as was referred to hereinbefore with reference to FIG. 1.

Although the invention is not limited thereto, detailed description will be set forth of several preferred embodiments wherein the television signal is reversed in its polarity by 180° at regular time intervals corresponding to the horizontal line period of the video signal.

Figure 4:
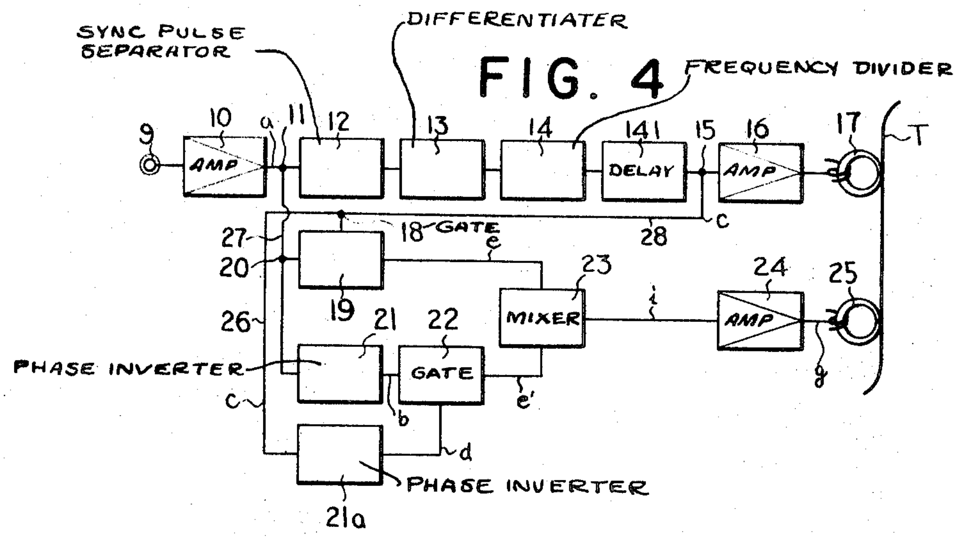
FIG. 4 is a block diagram, illustrating a preferred embodiment of the recording system as a part of the inventive system.
Figure 10:
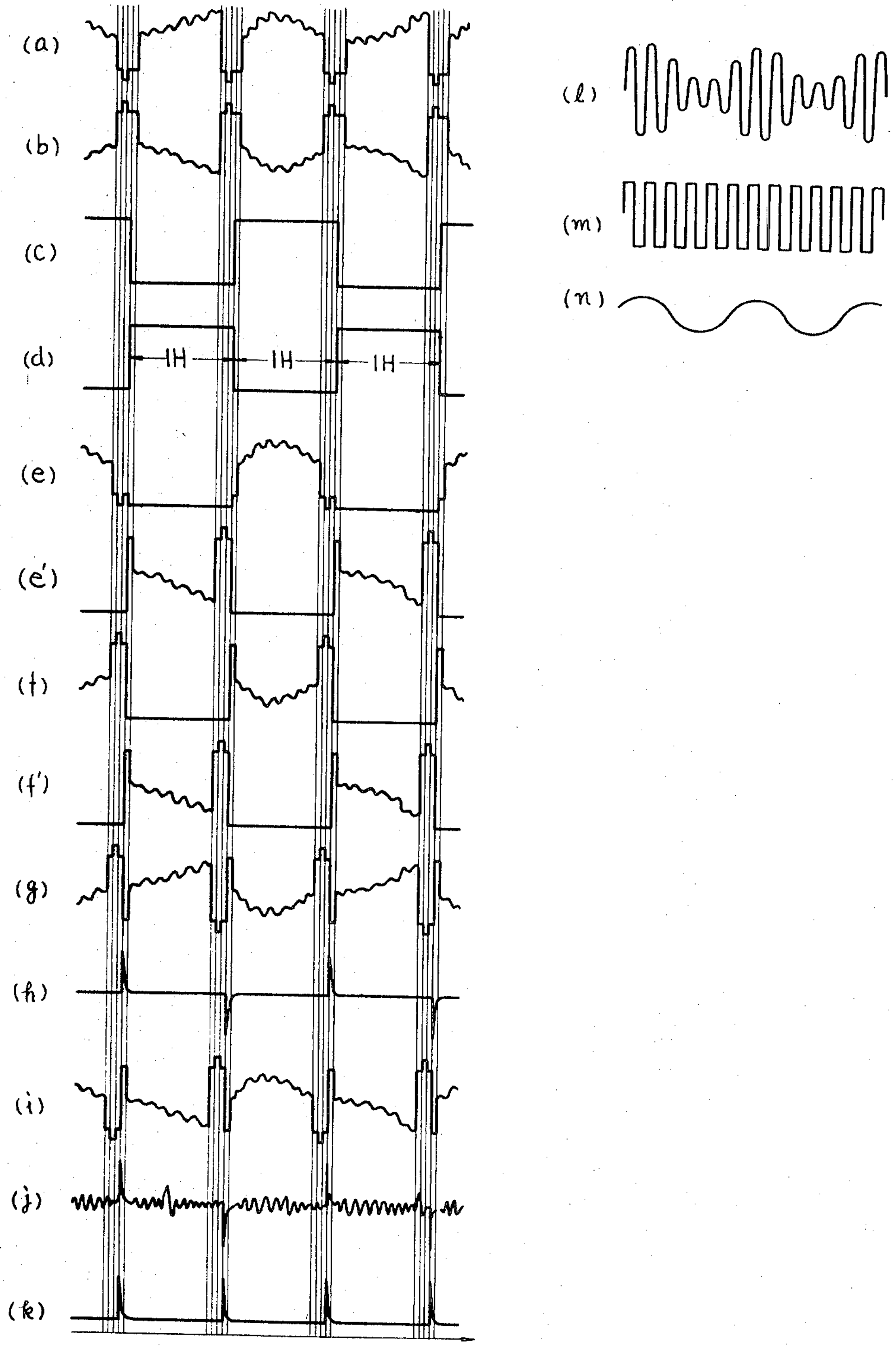
FIG. 10 is a wave chart showing several signals appearing several preferred points of the systems shown in foregoing several figures.

Next referring to FIG. 4 and the waveforms in FIG. 10, a television signal is fed through an input terminal 9 to preamplifier 10 of a conventional design, a model of this signal being shown in FIG. 3 by way of example. The amplified signal *a* will arrive at a junction point 11, from which it is conveyed through two separate systems.

In the first system, the signal is supplied to synchronizing signal separator 12. The separated synchronizing pulses are fed to differentiating circuit 13, thereby generating sharply rising pulses in the way as is commonly known.

These pulses are fed to frequency divider 14 comprising an oscillator, and converted into a gating pulse signal having a half frequency relative to the fed signal, and then conveyed to delay circuit 141, which acts to retard the gating pulse 0.1–3.8 microsecond when the signal phase reversing is to be initiated at the back porch.

The thus delayed square wave signals are processed in two ways. In the first way, this signal is fed through a junction point 15 to record amplifier 16, the amplified output therefrom being fed to a magnetic record head 17, which serves to record the supplied, pulses on a first record track on a magnetic tape T.

In the second way, the square wave signals are fed through junction point 15 and lead 28 to junction point 18 and processed further in two different ways.

As one of the last-mentioned ways, the square wave signal *c* is fed to gate circuit 19, while, as the second one of the said ways, the same signal is conveyed through lead 26 to phase reversing circuit 21*a*, wherein the signal is processed to have a 180°-phase shifted form as at *d* and fed to gate circuit 22.

On the other hand, the television signal branched off from junction point 11 is fed through lead 27 to junction point 20, thence processed in two different modes. In the first mode, the signal is fed to gate circuit 19, while, in the second mode, the signal is processed in a phase reversing circuit 21, thence in a waveform as at *b* to the gate circuit 22.

Video signals *e* and *e'* gated in circuits 19 and 22, respectively, are conveyed to a mixer 23. In this mixer, signals *e* and *e'* are coupled together so that the peak-to-peak amplitude signal is smaller than two times that of the original non-processed signal. In the specific embodiment shown, the two signals are so coupled together that the blanking level of signal *e* coincides substantially with the white level of signal *e'*. The thus combined signal as at *i* is amplified in record amplifier 24 and thence fed to a separate record head 25 for recording on a second track on the same tape T.

Figure 5:
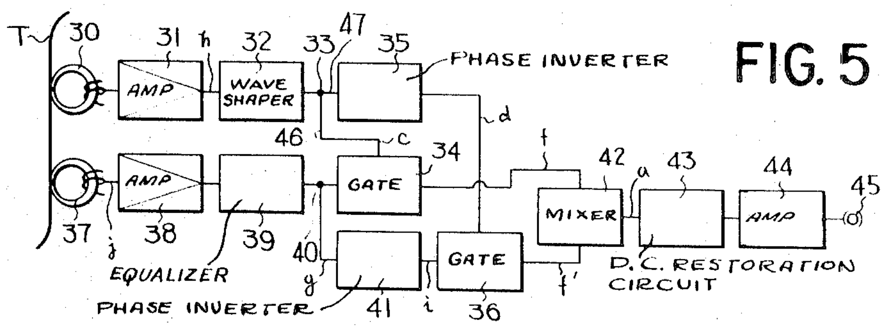
FIG. 5 is a block diagram, illustrating a preferred embodiment of the reproducing system as a part of the inventive system.

The thus recorded signals on the tape may be well reproduced by means of a reproducing system illustrated by way of example in FIG. 5.

Next referring to FIG. 5 and the waveforms in FIG. 10, the signal recorded on the first track of the tape is picked up by a first reproduce head 30 and then amplified in preamplifier 31. This output as at *b* is processed in wave shaping circuit 32, the output from which is conveyed to a junction point 33 and further processed in two different modes.

In the first mode, the signal is applied through a lead 46 to gate circuit 34, while, in the second mode, the signal is fed through a lead 47 to phase reversing circuit 35, thence in a waveform as at *d* to gate circuit 36.

On the other hand, the signal recorded on the second track on the tape is picked up by a second reproduce head 37, amplified in preamplifier 38 and processed in equalizer 39, whereupon the processed signal is conveyed to a junction point 40 so as to be treated in two different modes.

In the first mode, the output signal is conveyed to gate circuit 34, while, in the second mode, the same output as at *g* is fed through phase reversing circuit 41 to gate circuit 36. The gated signals *f* and *f'* as processed in gate circuits 34 and 36, respectively, are combined together in a mixer 42. The combined output signal *a* is then processed in DC restoration circuit 43 for recording DC and lower frequency components and finally the completely reproduced television signal is amplified in amplifier 44 and delivered through output terminal 45 to a receiving station such as a commercially available television set, not shown.

In the embodiment so far described, gate pulses have been recorded and reproduced in a separate track different from that for the video signals. This processing mode, however, is not requisite to the present invention, and this separate processing may be dispensed with as will be described hereinbelow more in detail.

Figure 6:
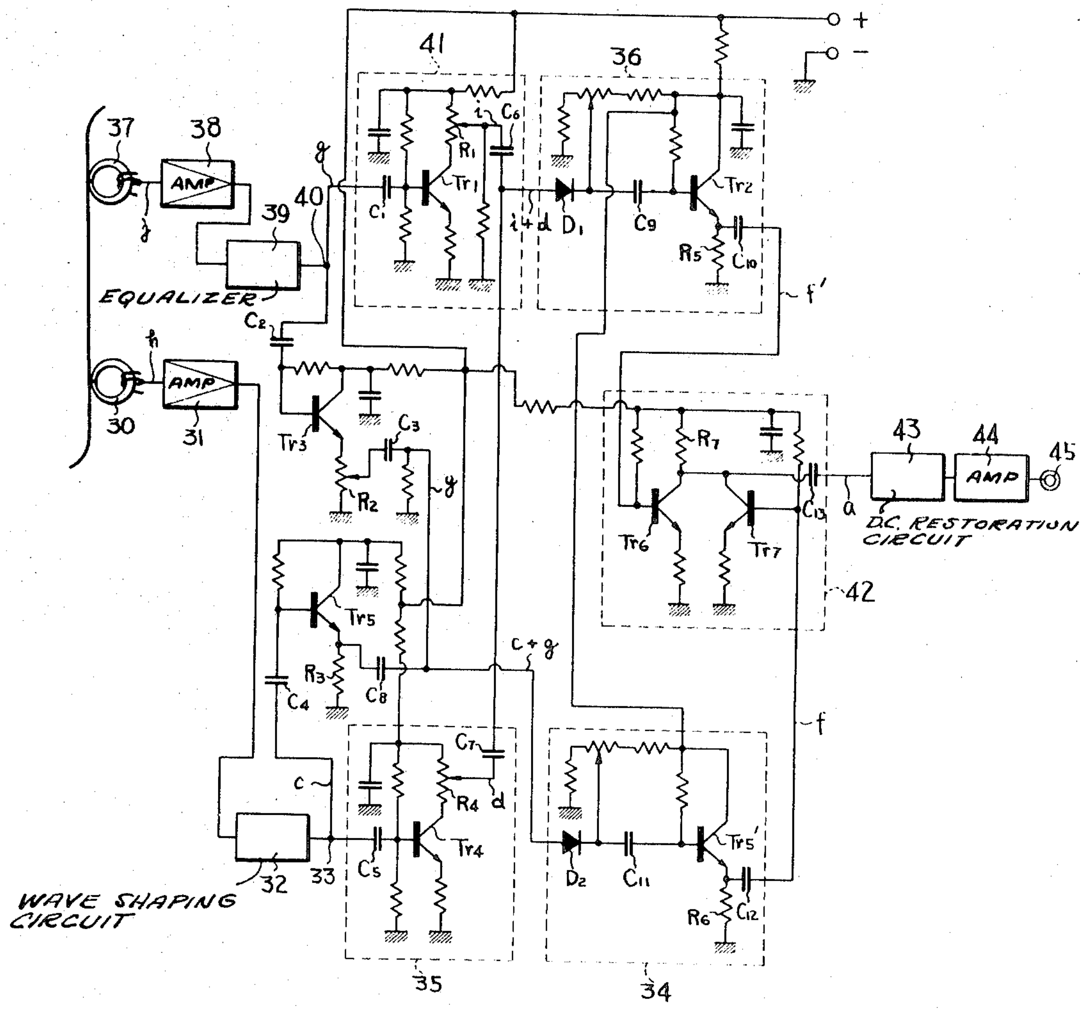
FIG. 6 is a wiring diagram of the reproducing system shown schematically in FIG. 5, wherein however several constituents are shown in their block form.

More specifically referring to FIG. 6, the signal picked up by the head 37, a kind of modified television signal having its polarity reversed at predetermined regular intervals, preferably every horizontal scanning period, generally denoted "H" in the television engineering, is fed though a preamplifier 38 to an equalizer circuit 39, which may be of conventional design frequency employed in the television engineering, so as to be processed therein for compensating distortions as frequently met in the course of the magnetic reproduction. The thus appearing signal form is shown at *g* in FIG. 10, in a schematic and simplified form and only by way of example.

This reproduced, modified television signal is conveyed to a junction point 40, and then processed in two different ways. In the first processing mode, the output signal is conveyed to a phase-reversing circuit 41, while in the second processing mode, the signal is fed through a coupling condenser C2 to the base electrode of a buffer transistor Tr3.

The signal conveyed to the circuit 41 is fed through a coupling condenser C1 to the base electrode of transistor Tr1, thereby a still modified television signal as at *i* in FIG. 10, having an opposite polarity relative to that of the input signal to the present circuit 41 at the place of collector resistor R1 of variable type. This phase-inverted output signal is then fed through a coupling condenser C6 to gate circuit 36.

In the second processing mode, the modified television as at *g* FIG. 10 is fed to the base electrode of buffer transistor Tr3 and appears at the place of emitter resistor R2, thence conveyed through a coupling condenser C3 to a gate circuit 34.

On the other hand, the signal picked up by another produced head 30 as at *h* in FIG. 10 is conveyed through a preamplifier 31 to shaping circuit 32, so to deliver a series of rectangular pulses as at *c* of the same wave chart. These pulses are then conveyed to a junction 33 and then processed in two different modes.

In the first mode, the signal is conveyed from junction 33 through a coupling condenser C5 to phase-converter circuit 35, wherein it is impressed to the base electrode of transistor Tr4, thus appearing at the place of collector resistor R4 with its reversed polarity as at *d* in FIG. 10. The signal pulse having a proper intensity by means of this variable resistor R4 is then conveyed through a coupling condenser C7, thence fed to a gate circuit 36 wherein it is combined with the output signal from the circuit 41.

The phase-reversed signal fed to the gate circuit 36 is conveyed to a diode D1, thus passing therethrough at every time where the pulse fed from phase-converter circuit 35 represents the positive polarity, thus being thereby gated and conveyed through a coupling condenser C9 to the base electrode of transistor Tr2. The thus processed signal appearing at the place of emitter resistor R5, having a signal form schematically represented at *f* in FIG. 10, is fed further through a coupling condenser C10 to a mixer circuit 42.

On the other hand, the pulse series branched off from the junction point 33 is then conveyed though a coupling condenser C4 to the base electrode of transistor Tr5, thus appearing at the place of variable emitter resistor R3. The thus processed pulse series adjusted as at *c* in FIG. 10 in its level by means of the variable resistor R3, is then fed through a coupling condenser C8 to gate circuit 34 wherein it is combined with the output signal from transistor Tr3.

The fed video signal to the gate circuit 34 is applied therein to a diode D2 and led to pass therethrough at every moment where the pulse from the transistor Tr5' represents a positive polarity, thereby being gated. The gated signal is led through a coupling condenser C11 to the base electrode of transistor Tr5', thereby appearing at emitter resistor R6 and in the waveform shown by way of example at *f* in FIG. 10. This signal is then fed through a coupling condenser C12 to mixer 42.

The output signal *f* from the gate circuit 36 representing alternatively nonsignal periods, each extending for a horizontal scanning period in the television, while the output signal *f* from the gate circuit 34 represents similar and regular pauses which correspond however respective to the signaling periods in the former signal.

These two kinds of signals are fed respectively to the base electrodes of transistors Tr6 and Tr7 so as to be combined with each other, the thus combined resultant signal having a reproduced and substantially standard television signal form as shown by way of example and schematically at *a* in FIG. 10 appearing at a common collector resistor R7, which signal is then fed through a coupling condenser C13 to a, DC restoration circuit 43 of any of the conventional design which is frequently utilized by the television engineer, for the restoration of the lost DC signal component, thence through an amplifier 44 to an output terminal 45 electrically connected to a picture monitor, not shown, for projecting a correspondingly reproduced picture image. Briefly, the processed signal form, in this specific embodiment, represents alternately reversed polarities at certain intervals each of which corresponds to the horizontal scanning period. It will be clearly understood from the drawings and the related disclosure that the total amplitude of the processed signal is smaller than twice the peak-to-peak amplitude of the original nonprocessed television signal.

Figure 7:
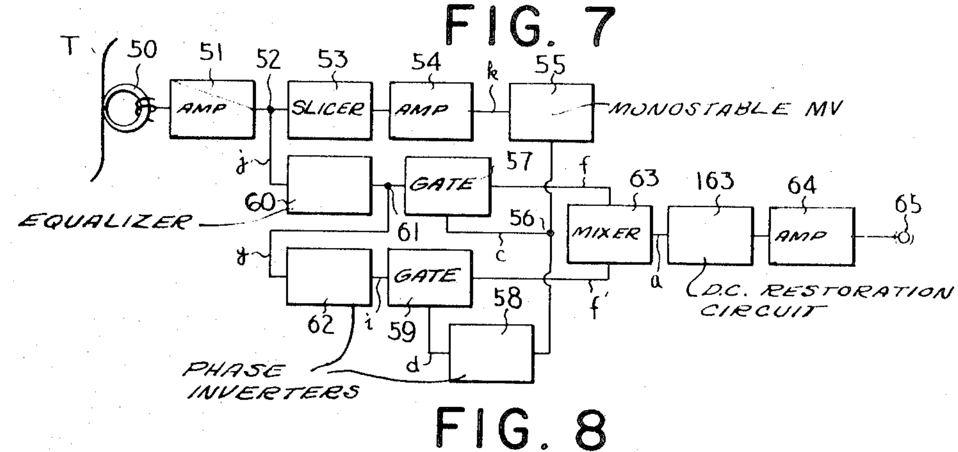
FIG. 7 is a slightly modified embodiment of the reproducing system shown in FIG. 5.

In the reproducing operation by means of the arrangement shown in FIG. 7, the video signal picked up by a reproduce head 50 from the second track on the tape T is amplified in preamplifier 51 and conveyed to a junction point 52, the signal form being shown by way of example at *j* in FIG. 10, thence further treated in two different modes.

In the first mode, the signal is fed to slicer 53 for separating pulses appearing at every reversal of the polarity of the signal. The separated signal is then amplified in amplifier 54, the outlet signal therefrom being illustrated in at *k* by way of example in FIG. 10. This signal is then fed to monostable multivibrator 55 for triggering thereof. As an example, the width of the pulses delivered from this multivibrator is selected to be 1H, wherein "H3" corresponds to 63.5 milliseconds as commonly known.

The output signal delivered from multivibrator 55, the waveform being shown by way of example at *c* in FIG. 10 is conveyed to a junction point 56, thence processed in two different modes.

In the first mode, the signal is fed to gate circuit 57, while, in the second mode, the signal is fed through polarity reversing circuit 58 to gate circuit 59 in the signal form shown by way of example at *d* in FIG. 10.

On the other hand, the video signal branched off from junction point 52, is processed in equalizer 60 and conveyed through junction point 61 in two different ways. In the first way, the signal output of the form as at *g* in FIG. 10 is fed to gate circuit 57, while, in the second way, the signal output is fed through polarity reversing circuit 62 to gate circuit 59. The thus gated output signals of the form at *f* in FIG. 10 by way of example are fed and both signals are so coupled together that the blanking levels coincide with each other. The resulted combined signal is then processed in DC restoration circuit 163, amplified in amplifier 64 and finally delivered through output terminal 65 to a television receiving set or the like, not shown.

In the above-described embodiment, the processing has been relied upon the negative polarity synchronizing principle. It would be naturally conceivable to rely upon the positive polarity principle, instead of negative one, and that this modified processing mode would still further contribute the improvement of S/N.

More specifically, in the case of the positive polarity synchronizing system, the synchronizing signals direct towards the "white" level, the peak-to-peak value will be reduced to about 1/1.8 in comparison with that in the corresponding case of the negative polarity synchronizing system when assuming that the amplitude of the video signal presently being treated is a certain constant value in these both cases. Therefore, when relying upon the positive polarity principle, the recording may be carried into effect with the amplitude about 1.8 times larger than that available in the case of the negative polarity system. Therefore, the ratio of S/N will be further improved by about 6 db. in a specific embodiment, when the synchronizing pulses are converted into those having the positive corresponding pulses.

In a modification shown in FIG. 7, the reversing was carried into effect at the back porch of the horizontal blanking pulses. In an alternative measure, the conversion may be carried out at the front porch of each horizontal blanking pulse without hindrance.

In a further modification, although not shown, the gate pulses as generated and processed in the system according to the invention may be, when necessary, modulated additionally by audio signal currents.

Figure 8:
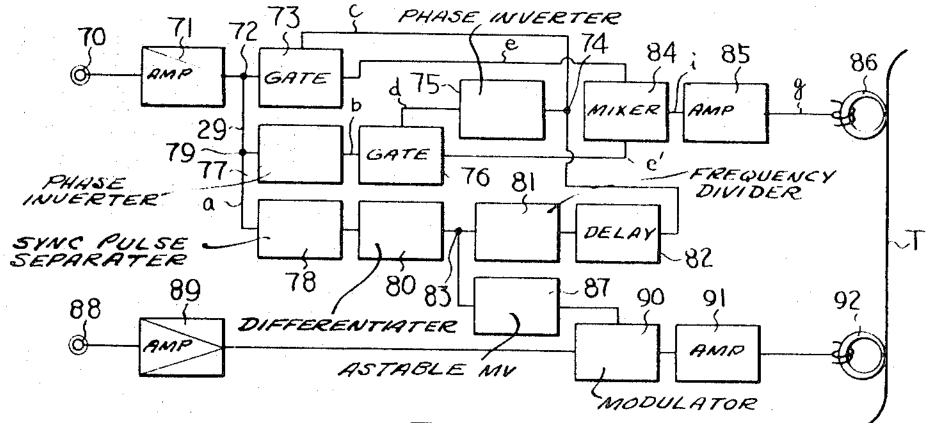
FIG. 8 is the recording part of a second embodiment of the inventive system, illustrated in a block diagram.

A modification of recording system shown in FIG. 8, the video input signal is fed through input terminal 70 to preamplifier 71, the output signal thereof as at *a* in FIG. 10 is then conveyed to a junction point 72 and processed in the following two different modes.

In the first mode, the signal is fed to gate circuit 73, while, in the second mode, the signal is fed through a lead 29 and a junction pint 79, thence further conveyed and processed in the following separate two ways:

In the first way, the signal is fed to phase reversing circuit 77, thence in the waveform *b* in FIG. 10 to gate circuit 76. In the second way, the signal is fed to synchronizing signal separator 78, then to differentiating circuit 80, thereby producing sharply rising signals as before. This differentiated signal is then conveyed to a junction point 83 and further processed in two different ways:

In the first mode, the signal is fed to frequency divider 81 composed of astable multivibrator so as to be converted into rectangular pulse signal having one-half the fed signal frequency. These rectangular signal pulses are processed in delay circuit 82 so as to provide a properly selected delay time in comparison with the signal phase in advance of this processing, and then conveyed to a junction point 74 from which the signal is conveyed and processed in two different modes:

In the first mode, the signal having the shape as schematically represented by way of example at *c* in FIG. 10 is fed to gate circuit 73, while, in the second mode, the signal is fed through phase converter 75 for reversing just 180° the polarity of the signal as represented schematically at *d* in FIG. 10 to gate circuit 76.

On the other hand, the signal branched off from a junction point 83, is utilized for controlling astable multivibrator 87 so as to deliver therefrom a series of rectangular square wave pulses having a frequency of 15.75 kc., and synchronized with the horizontal synchronizing signal pulse contained in the originally fed television signal. These output pulses are fed to amplitude modulator 90, while, on the other hand, audio signal currents fed to a separate input terminal 88 in synchronism with the fed television signal, are supplied to amplifier 89 and the amplified signal output therefrom is impressed to amplitude modulator 90 for the amplitude modulation of the fed square wave pulses referred to above. The output signal from the modulator 90 is, after being amplified through an amplifier 91, recorded by means of record head 92, on a first track, by way of example, on the tape T.

The gated signal outputs from gate circuits 73 and 76, respectively, being shown schematically in respective *e* and *e'* in FIG. 10 are combined together by means of a mixer 84 so that the peak-to-peak amplitude of the resulted signal is smaller than twice the original peak-to-peak amplitude of the original television signal. The combined signal is then fed in the form as at *i* in FIG. 10 through record amplifier 85 to record head 86 which serves for recording the fed signal as at *g* on a second track of the same tape T.

Figure 9:
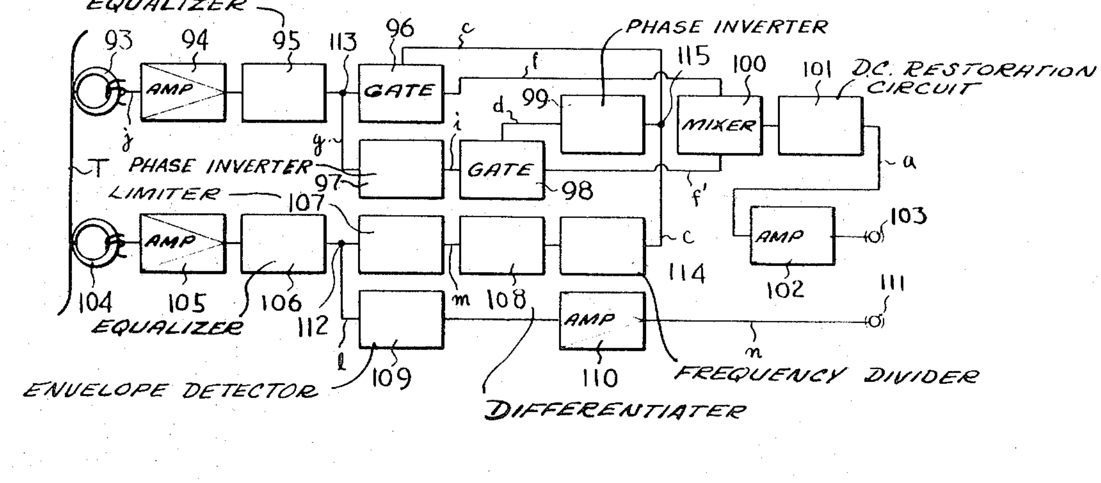
FIG. 9 is a block diagram of the reproducing part of the second embodiment of this invention.

In the corresponding reproducing system illustrated in FIG. 9, the recorded signal on the first track of the tape is picked up by means of a reproduce head 104. This signal, of course, a kind of amplitude-modulated signal by the corresponding audio currents, is fed to preamplifier 105, processed by equalizer 106 and conveyed to a junction point 112 to be further processed in two different ways. The signal form is illustrated by way of example and schematically at *l* in FIG. 10. In the first way, the signal is fed to amplitude limiter 107, while, in the second way, the signal is fed to envelope detector 109 for separating the combined audio signals, which are then processed by amplifier 110 and supplied through output terminal 111 to a loudspeaker, not shown. The output signal shape is shown schematically at *n* in FIG. 10.

The output signal, as at *m* in FIG. 10, from the amplitude limiter 107 is fed to differentiating circuit 108 for converting into sharply rising pulses which are then conveyed to frequency divider 114 comprising a rectangular square wave pulse generating oscillator so as to reduce the frequency to one-half the original frequency in advance of this processing, and in the form of rectangular square wave signal, as at *c* in FIG. 10, which is conveyed to a junction point 115. From this point, the signal is processed in the following two ways:

In the first way, the signal is fed to gate circuit 96, while, in the second way, the signal is processed in a phase reversing circuit 99, thence to gate circuit 98.

The video signal having a waveform as at *j* in FIG. 10 and picked up from the second track of tape T, for instance, by a reproduce head 93, is processed in a preamplifier 94 and an equalizer 95 and then conveyed in a waveform, as at *g* in FIG. 10, to a junction point 113. This output signal from equalizer 95 as at *g* in FIG. 10 is then processed in the following two modes:

In the first mode, the signal is fed to gate circuit 96, while, in the second mode, the signal is processed in phase reversing circuit 97, the output signal therefrom as at *i* in FIG. 10 is fed to gate circuit 98. The gated signals *f* and *f'* shown in FIG. 10 are combined together in a mixer 100 so as to coincide the blanking levels of the signals (E) and (F) with each other, the output therefrom is processed by DC restoration circuit 101 for the rearrangement of the DC level of the synchronizing pulses at a predetermined value. The thus processed signal in the form as at *a* in FIG. 10 is amplified at an amplifier 102 and then delivered through an output terminal 103 to the television receiving set.

It will be seen from the foregoing detailed description, that by processing the television signal as proposed by the present invention, the contained frequency components lower than 15.75/2kc./s. (horizontal scanning frequency) can be converted to those of over 15.75/2kc./s., thereby avoiding the loss of lower frequency components in the course of magnetic recording and reproducing.

Further, by shifting the lower frequency components toward the higher frequency ones in the above-mentioned way, otherwise possible fluctuation of the alternating current axis because of the lack of the lower frequency components may be substantially reduced, thereby correspondingly reducing the total frequency range being made and increasing the peak-to-peak amplitude of the signal to be recorded resulting in the desired improvement of the S/N. In addition, the otherwise possible considerable shifting of the AC axis caused by the AC coupling equipment can be suppressed to allowable and reasonable values so as to utilize the linear magnetic conversion characteristic range of the magnetic medium to its full degree. In this way, the television signal as supplied can be effectively recorded and reproduced without any appreciable distortion of lower frequency signal components such as synchronizing pulses contained, for reproducing the picture in a sharply clear and highly stable manner on a Braun tube.

As a further advantage of the present invention, noises of lower frequencies as appearing after the synthetic composition of signal components in the case of the magnetic recording and in advance of the synthetic composition of picked up signal components can be canceled out in the visual effect of the reproduced picture, because of that the signal is caused to reverse the polarity at regular short intervals such as for instance, IH in the foregoing embodiments. More specifically, noises generated during the nonreversed video signal parts will appear white on a monitoring set, while those generated during the alternately reversed television signal parts will appear black on the monitoring set, since these, together with video signals, are further reversed in the course of the reproducing state in the video tape recorder embodying the principles of the invention. In effect, said white and black images cancel out in the viewer's visual sense.

Of course it should be understood that there may be various different embodiments of the system without departing from the scope of the present invention.

Having now particularly described and ascertained the nature of our said invention, and in what manner the same is to be performed, we declare that what we claim is:

1. A video signal direct-recording and direct-reproducing system fitted with a recording and a reproducing magnetic head respectively, kept in sliding contact with one and the same tract on an elongated magnetizable tape threaded on a tape recorder for running a predetermined constant speed, characterized by such means for reversing the polarity of the video signal to be fed to the recording head at time intervals in the recording system which are at least as great as the horizontal period of the video signal, means for reversing back the thus reversed polarity of the reproduced signal at the corresponding time intervals in the reproducing system for providing a regular shaped video signal the same as that fed to said recording system, and means for separately recording and reproducing said gating pulses, said means for reversing polarity of the video signals further comprising a. means responsive to the blanking signals in said video signal for generating said gating pulses, b. means responsive to said gating pulses for alternately gating to a first and second terminal respectively, said video signal inverted and said video signal noninverted c. means connected to said first and second terminals for combining and controlling the level of said gated video signals, inverted and noninverted to create an output signal having a peak-to-peak amplitude less than twice the peak-to-peak amplitude of the original video signal.

2. A video signal direct-recording and direct-reproducing system fitted with a recording and a reproducing magnetic head respectively, kept in sliding contact with one and the same tract on an elongated magnetizable tape threaded on a tape recorder for running a predetermined constant speed characterized by a. means for reversing the polarity of the video signal to be fed to the recording head at time intervals in the recording system which are at least as great as the horizontal period of the video signal, said means for reversing comprising,
   i. means responsive to the blanking signals in said video signals for generating gating pulses,
   ii. means responsive to said gating pulses for alternately gating to a first and second terminal respectively, said video signal inverted and said video signal noninverted and
   iii. means connected to said first and second terminals for combining and controlling the level of said gated video signals, inverted and noninverted to create an output signal having a peak-to-peak amplitude less than twice the peak-to-peak amplitude of the original video signal, and b. means for reversing back the thus reversed polarity of the reproduced signal at the corresponding time intervals in the reproducing system, for providing a regular shaped video signal the same as fed to said recording system, said means for reversing back comprising
   i. means for reproducing a recorded periodically phase-inverted video signal
   ii. means responsive to a recording signal for generating gating pulses having a duration equal to the horizontal scan period of said video signal, and
   iii. phase-inverting means responsive to said gating pulses and said reproduced video signal for reversing the phase of said reproduced video signal periodically at periods equal to the horizontal scan period of said video signal.